United States Patent
Lin et al.

(10) Patent No.: US 9,485,610 B2
(45) Date of Patent: Nov. 1, 2016

(54) BLUETOOTH DEVICE, PROJECTION DEVICE AND DATA TRANSMISSION METHOD

(71) Applicant: Coretronic Corporation, Hsin-Chu (TW)

(72) Inventors: Chien-Hsu Lin, Hsin-Chu (TW); Juita Liu, Hsin-Chu (TW); Chun-Chieh Wang, Hsin-Chu (TW); Chih-Hsiang Li, Hsin-Chu (TW); Chien-Yi Yang, Hsin-Chu (TW)

(73) Assignee: Coretronic Corporation, Hsin-Chu (TW)

( * ) Notice: Subject to any disclaimer, the term of this patent is extended or adjusted under 35 U.S.C. 154(b) by 0 days.

(21) Appl. No.: 14/741,318

(22) Filed: Jun. 16, 2015

(65) Prior Publication Data

US 2016/0080894 A1 Mar. 17, 2016

(30) Foreign Application Priority Data

Sep. 15, 2014 (CN) .......................... 2014 1 0468952

(51) Int. Cl.
*H04B 7/00* (2006.01)
*H04W 4/00* (2009.01)
*H04B 1/3816* (2015.01)
*H04L 12/863* (2013.01)
*H04W 76/02* (2009.01)

(52) U.S. Cl.
CPC ........... *H04W 4/008* (2013.01); *H04B 1/3816* (2013.01); *H04L 47/6245* (2013.01); *H04W 76/023* (2013.01)

(58) Field of Classification Search
CPC ... H04W 84/18; H04W 88/06; H04W 76/02; H04M 1/7253; H04M 2250/02
USPC ................. 455/41.2, 418–420, 422.1, 435.1, 455/456.1, 550.1, 333
See application file for complete search history.

(56) References Cited

U.S. PATENT DOCUMENTS

| | | | |
|---|---|---|---|
| 2002/0101706 A1 | 8/2002 | Shin | |
| 2005/0062945 A1 | 3/2005 | Shin-Pin | |
| 2009/0298428 A1* | 12/2009 | Shin | ..................... H04W 76/025 455/41.2 |
| 2011/0136434 A1 | 6/2011 | Choi | |
| 2013/0324191 A1* | 12/2013 | Chen | ................... H04M 1/7253 455/557 |

* cited by examiner

*Primary Examiner* — Nhan Le
(74) *Attorney, Agent, or Firm* — Li-Jen Shen

(57) ABSTRACT

A Bluetooth device used for data transmission between first and second peripheral devices is provided. The Bluetooth device includes a processing circuit and a Bluetooth chip configured to be capable of being operated in a transmitting mode and a receiving mode for data transmitting and data receiving, respectively. In the transmitting mode, a first communication link is established between the Bluetooth chip and the first peripheral device through a first communication protocol. The processing circuit establishes a second communication protocol. In the receiving mode, a second communication link is established between the Bluetooth chip and the second peripheral device through a third communication protocol. The second peripheral device transmits a data to the Bluetooth chip through the second communication link and the Bluetooth chip transmits, based on the second communication protocol, the received data to the first peripheral device through the first communication link simultaneously.

15 Claims, 3 Drawing Sheets

BLUETOOTH DEVICE, PROJECTION DEVICE AND DATA TRANSMISSION METHOD

FIELD OF THE INVENTION

The present invention relates to Bluetooth device, projection device and data transmission method, and more particularly to Bluetooth device, projection device and data transmission method capable of performing data synchronous transmission.

BACKGROUND OF THE INVENTION

Because having low power consumption and qualified transmission efficiency, Bluetooth transmission technology is widely used in the short-range wireless communication between varieties of electronic devices. Generally, because the data transmitting and data receiving by Bluetooth chip are performed based on different communication protocols, it is not allowed to have the synchronous transmission of data between two different communication protocols. Therefore, a conventional Bluetooth chip receives all the data transmitted from one device first and then transmit the received data to another device. In order to make the data transmission more efficient between two different electronic devices (i.e. transmitting the data at the same of receiving data) by using Bluetooth chips, it is necessary to develop a Bluetooth device capable of receiving and transmitting data simultaneously.

The information disclosed in this "BACKGROUND OF THE INVENTION" section is only for enhancement understanding of the background of the invention and therefore it may contain information that does not form the prior art that is already known to a person of ordinary skill in the art. Furthermore, the information disclosed in this "BACKGROUND OF THE INVENTION" section does not mean that one or more problems to be solved by one or more embodiments of the invention were acknowledged by a person of ordinary skill in the art.

SUMMARY OF THE INVENTION

The present invention provides a Bluetooth device used for data synchronous transmission between pluralities of peripheral devices.

The present invention further provides a data transmission method for the aforementioned Bluetooth device.

The present invention still further provides a projector device equipped with the aforementioned Bluetooth device.

Other objects and advantages of the invention can be further illustrated by the technical features broadly embodied and described as follows.

In order to achieve one or a portion of or all of the objects or other objects, an embodiment of the invention discloses a Bluetooth device used for data transmission between a plurality of peripheral devices including a first peripheral device and a second peripheral device. The Bluetooth device includes a processing circuit and a Bluetooth chip. The Bluetooth chip is electrically connected to the processing circuit and configured to be capable of being operated in a transmitting mode and a receiving mode for data transmitting and data receiving, respectively. When the Bluetooth chip is operated in the transmitting mode through a control of the processing circuit, a first communication link is established between the Bluetooth chip and the first peripheral device through a first communication protocol. The processing circuit is configured to establish a second communication protocol, which allows the Bluetooth chip operated in the receiving mode to perform a data synchronous transmission. When the Bluetooth chip is operated in the receiving mode through a control of the processing circuit, a second communication link is established between the Bluetooth chip and the second peripheral device through a third communication protocol. The second peripheral device transmits a data to the Bluetooth chip through the second communication link and the Bluetooth chip transmits, based on the second communication protocol, the received data to the first peripheral device through the first communication link simultaneously.

In one embodiment, when being operated in the receiving mode, the Bluetooth chip is configured, by the second communication protocol, to simultaneously transmit the received data to the first peripheral device through the first communication link in a first-in-first-out (FIFO) streaming manner.

In one embodiment, the Bluetooth device further includes a display unit electrically connected to the processing circuit. When being operated in the transmitting mode through the control of the processing circuit, the Bluetooth chip is configured to search the plurality of peripheral devices and display a searching result as a searching list on the display unit in a listing manner. When the first peripheral device is selected from the searching list, the Bluetooth chip is configured to issue a first link request to the first peripheral device, and the first peripheral device responds a first link confirmation to the Bluetooth chip thereby establishing the first communication link through the first communication protocol. The display unit is configured to display ready-to-transmit-data information when the first communication link is established.

In one embodiment, the display unit is further configured to display a communication-protocol-established information when the second communication protocol is established, and then the processing circuit controls the Bluetooth chip to be operated in the receiving mode.

In one embodiment, when the Bluetooth chip is operated in the receiving mode through the control of the processing circuit, the second peripheral device issues a second link request to the Bluetooth chip, and the Bluetooth chip responds a second link confirmation to the second peripheral device thereby establishing the second communication link through the third communication protocol. The display unit is further configured to display ready-to-receive-data information when the second communication link is established.

In one embodiment, the data is an audio signal.

In one embodiment, the processing circuit communicates with the Bluetooth chip in accordance with Universal Asynchronous Receiver/Transmitter (UART).

The present invention further discloses a data transmission method of a Bluetooth device for transmitting data between a plurality of peripheral devices including a first peripheral device and a second peripheral device. The data transmission method includes steps of: searching the plurality of peripheral devices and selecting the first peripheral device from a searching list; issuing a first link request to the first peripheral device; receiving a first link confirmation responded from the first peripheral device thereby establishing a first communication link between the Bluetooth device and the first peripheral device through a first communication protocol; establishing a second communication protocol; receiving a second link request issued from a second peripheral device; responding a second link confirmation to the second peripheral device thereby establishing a second communication link between the Bluetooth device and the second peripheral device through a third communication protocol; and receiving a data transmitted from the second peripheral device through the second communication link, linking the first and second communication links through the second communication protocol, and simultaneously transmitting the received data to the first peripheral device through the first communication link.

The present invention further discloses a projector device, which includes an optical projection device and a Bluetooth device. The Bluetooth device, electrically coupled to the optical projection device, is used for data transmission between a plurality of peripheral devices including a first peripheral device and a second peripheral device. The Bluetooth device includes a processing circuit and a Bluetooth chip. The Bluetooth chip is electrically connected to the processing circuit and configured to be capable of being operated in a transmitting mode and a receiving mode for data transmitting and data receiving, respectively. When the Bluetooth chip is operated in the transmitting mode through a control of the processing circuit, a first communication link is established between the Bluetooth chip and the first peripheral device through a first communication protocol. The processing circuit is configured to establish a second communication protocol, which allows the Bluetooth chip operated in the receiving mode to perform a data synchronous transmission. When the Bluetooth chip is operated in the receiving mode through a control of the processing circuit, a second communication link is established between the Bluetooth chip and the second peripheral device through a third communication protocol. The second peripheral device transmits a data to the Bluetooth chip through the second communication link and the Bluetooth chip transmits, based on the second communication protocol, the received data to the first peripheral device through the first communication link simultaneously.

In one embodiment, when being operated in the receiving mode, the Bluetooth chip is configured, by the second communication protocol, to simultaneously transmit the received data to the first peripheral device through the first communication link in a first-in-first-out (FIFO) streaming manner.

In one embodiment, the Bluetooth device further includes a display unit electrically connected to the processing circuit. When being operated in the transmitting mode through the control of the processing circuit, the Bluetooth chip is configured to search the plurality of peripheral devices and display a searching result as a searching list on the display unit in a listing manner. When the first peripheral device is selected from the searching list, the Bluetooth chip is configured to issue a first link request to the first peripheral device, and the first peripheral device responds a first link confirmation to the Bluetooth chip thereby establishing the first communication link through the first communication protocol. The display unit is configured to display ready-to-transmit-data information when the first communication link is established.

In one embodiment, the display unit is further configured to display a communication-protocol-established information when the second communication protocol is established, and then the processing circuit controls the Bluetooth chip to be operated in the receiving mode.

In one embodiment, when the Bluetooth chip is operated in the receiving mode through the control of the processing circuit, the second peripheral device issues a second link request to the Bluetooth chip, and the Bluetooth chip responds a second link confirmation to the second peripheral device thereby establishing the second communication link through the third communication protocol. The display unit is further configured to display ready-to-receive-data information when the second communication link is established.

In one embodiment, the data is an audio signal.

In one embodiment, the processing circuit communicates with the Bluetooth chip in accordance with Universal Asynchronous Receiver/Transmitter (UART).

In one embodiment, the first peripheral device is a wireless Bluetooth speaker.

In one embodiment, the second peripheral device is a handheld device capable of outputting an audio signal.

In summary, through configuring the processing circuit to establish the second communication protocol, the Bluetooth device in the receiving mode of the embodiments of the present invention is capable of simultaneously transmitting the received data from one peripheral device to another peripheral device, thereby realizing the data synchronous transmission and real-time data display.

Other objectives, features and advantages of the present invention will be further understood from the further technological features disclosed by the embodiments of the present invention wherein there are shown and described preferred embodiments of this invention, simply by way of illustration of modes best suited to carry out the invention.

BRIEF DESCRIPTION OF THE DRAWINGS

The invention will become more readily apparent to those ordinarily skilled in the art after reviewing the following detailed description and accompanying drawings, in which.

DETAILED DESCRIPTION OF PREFERRED EMBODIMENTS

In the following detailed description of the preferred embodiments, reference is made to the accompanying drawings which form a part hereof, and in which are shown by way of illustration specific embodiments in which the invention may be practiced. In this regard, directional terminology, such as "top," "bottom," "front," "back," etc., is used with reference to the orientation of the Figure(s) being described. The components of the present invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the present invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing,"

"faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive.

Figure 1:
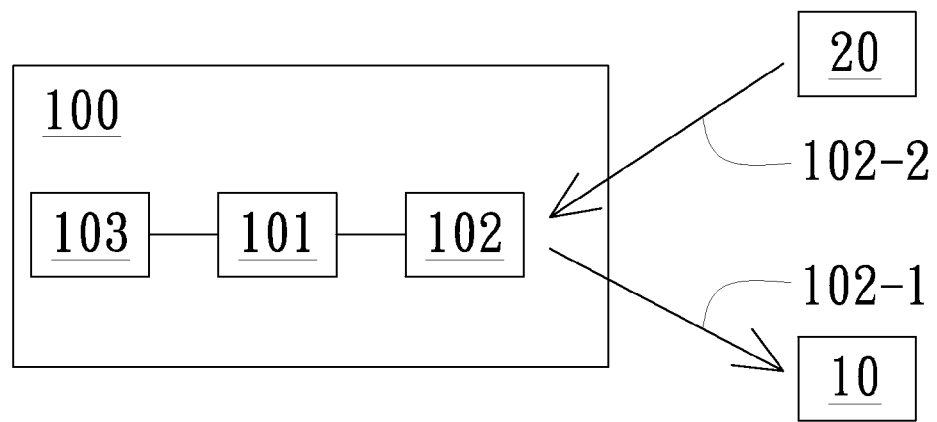
FIG. 1 is a block view of a Bluetooth device in accordance with an embodiment of the present invention.

FIG. 1 is a block view of a Bluetooth device in accordance with an embodiment of the present invention. The Bluetooth device of the present invention can be used for data transmission between pluralities of peripheral devices. To facilitate a better understanding of the embodiments of the present invention, in the embodiment indicated in FIG. 1, the Bluetooth device 100 of the present embodiment exemplarily links with two peripheral devices 10, 20; however, the present invention is not limited thereto. In one embodiment, the first peripheral device 10 and the second peripheral device 20 are not the same one device. Referring to FIG. 1, the Bluetooth device 100 includes a processing circuit 101 and a Bluetooth chip 102. The Bluetooth chip 102 is electrically connected to the processing circuit 101. The Bluetooth chip 102 is configured to, through a control of the processing circuit 101, be capable of being operating in a transmitting mode and in a receiving mode for transmitting and receiving data, respectively. Specifically, when the Bluetooth chip 102 is operated in the transmitting mode, a communication link 102-1 is established between the Bluetooth chip 102 of the Bluetooth device 100 and a Bluetooth chip (not shown) of the peripheral device 10 through a first communication protocol. In the present embodiment, the first communication protocol allows the Bluetooth chip 102 to perform a data transmission with the Bluetooth chip of the peripheral device 10. The processing circuit 101 may be further configured to establish a second communication protocol by itself. The second communication protocol allows the Bluetooth chip 102 to perform a synchronous transmission of data while being operated in the receiving mode. The detailed operation will be described as follow. When the Bluetooth chip 102 is operated in a receiving mode through a control of the processing circuit 101, a communication link 102-2 is established between the Bluetooth chip 102 of the Bluetooth device 100 and a Bluetooth chip (not shown) of the peripheral device 20 through a third communication protocol. In the present embodiment, the third communication protocol allows the Bluetooth chip 102 to receive data from the Bluetooth chip of the peripheral device 20. It is to be noted that through the second communication protocol established by the processing circuit 101 itself; the first and third communication protocols are able to communicate with each other and corporately perform a synchronous transmission of data. Once the communication links 102-1, 102-2 and the second communication protocol are established, the Bluetooth chip of the peripheral device 20 can transmit data to the Bluetooth chip 102 of the Bluetooth device 100 through the communication link 102-2 and the Bluetooth chip 102 can, under a permission of the second communication protocol, transmit the received data to the Bluetooth chip of the peripheral device 10 through the communication link 102-1 simultaneously.

In one embodiment, when being operated in the receiving mode through a control of the processing circuit 101, the Bluetooth chip 102 is configured, by the second communication protocol established by the processing circuit 101, to simultaneously transmit the received data to the Bluetooth chip of the peripheral device 10 through the communication link 102-1 in a first-in-first-out (FIFO) streaming manner.

In the present embodiment, the Bluetooth device 100 may further include a display unit 103 which is electrically connected to the processing circuit 101. When being operated in the transmitting mode through a control of the processing circuit 101, the Bluetooth chip 102 is configured to search the peripheral device(s) within a specific range and display the searching result as a searching list on the display unit 103 in a listing manner. When the peripheral device 10 is selected by a user from the searching list, the Bluetooth chip 102 is configured to issue a first link request to the Bluetooth chip of the selected peripheral device 10. Then, the Bluetooth chip of the selected peripheral device 10 responds a first link confirmation to the Bluetooth chip 102 to confirm the request of the first link, thereby establishing the communication link 102-1 through the first communication protocol. Once the communication link 102-1 is established, the display unit 103 displays a ready-to-transmit-data information, which indicates that the Bluetooth device 100 is ready to transmit data to the Bluetooth chip of the peripheral device 10. Then, the processing circuit 101 establishes the second communication protocol. Once the second communication protocol is established, the display unit 103 displays communication-protocol-established information. Then, the processing circuit 101 controls the Bluetooth chip 102 to operate in the receiving mode. In one embodiment, the display unit 103 may be a display screen of a projector equipped with the Bluetooth device 100 or a display image, such as the on-screen display (OSD), projected by the projector.

When the Bluetooth chip 102 is operated in the receiving mode through a control of the processing circuit 101, the Bluetooth chip of the peripheral device 20 issues a second link request to the Bluetooth chip 102 of the Bluetooth device 100. Then, the Bluetooth chip 102 responds a second link confirmation to the Bluetooth chip of the peripheral device 20 to confirm the request of the second link, thereby establishing the communication link 102-2 through the third communication protocol. Once the communication link 102-2 is established, the display unit 103 displays ready-to-receive-data information, which indicates that the Bluetooth device 100 is ready to receive data from the Bluetooth chip of the peripheral device 20.

In one preferred embodiment, the data transmitted through the Bluetooth device 100 is an audio signal due to the bandwidth limitation of Bluetooth; however, the present invention is not limited thereto.

In one embodiment of the Bluetooth device 100, the processing circuit 101 communicates with the Bluetooth chip 102 in accordance with the Universal Asynchronous Receiver/Transmitter (UART). However, it is understood that the aforementioned communication may be realized by other means, and the present invention is not limited thereto.

Figure 2:
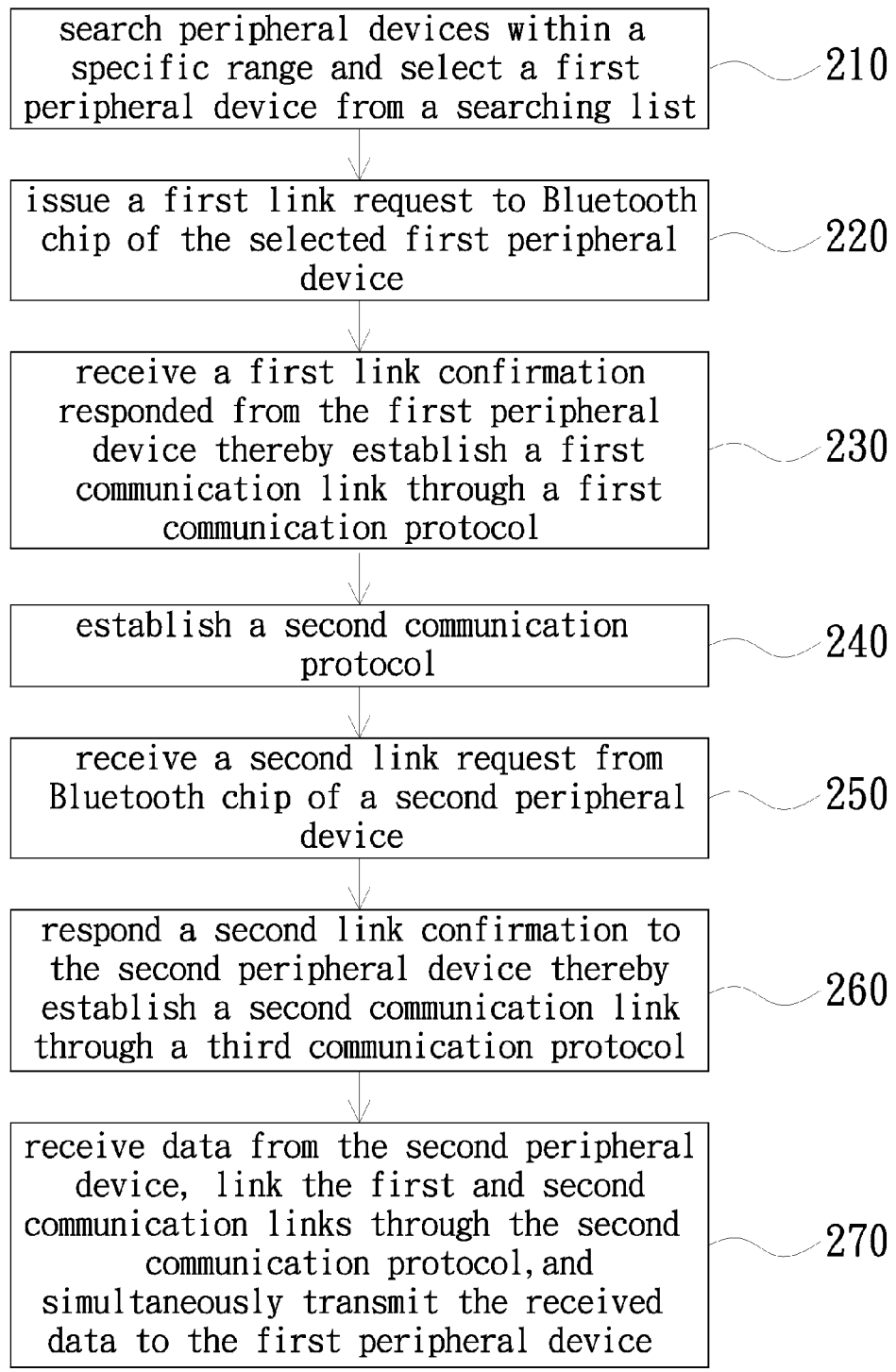
FIG. 2 is a flowchart of a data transmission method in accordance with an embodiment of the present invention.

FIG. 2 is a flowchart of a data transmission method in accordance with an embodiment of the present invention, wherein the data transmission method is developed based on an operation of the Bluetooth device 100. Referring to FIG. 2, the data transmission method in the present embodiment includes steps of: searching the peripheral devices within a specific range and selecting a first peripheral device from a searching list (step 210); issuing a first link request to the Bluetooth chip of the selected first peripheral device (step 220); receiving a first link confirmation responded from the first peripheral device thereby establishing a first communication link through a first communication protocol (step 230); establishing a second communication protocol (step 240); receiving a second link request issued from the Bluetooth chip of a second peripheral device (step 250); responding a second link confirmation to the second peripheral device thereby establishing a second communication link through a third communication protocol (step 260); receiving data transmitted from the second peripheral device through the second communication link, linking the first and second communication links through the second communication protocol, and simultaneously transmitting the received data to the Bluetooth chip of the first peripheral device through the first communication link (step 270).

Figure 3:
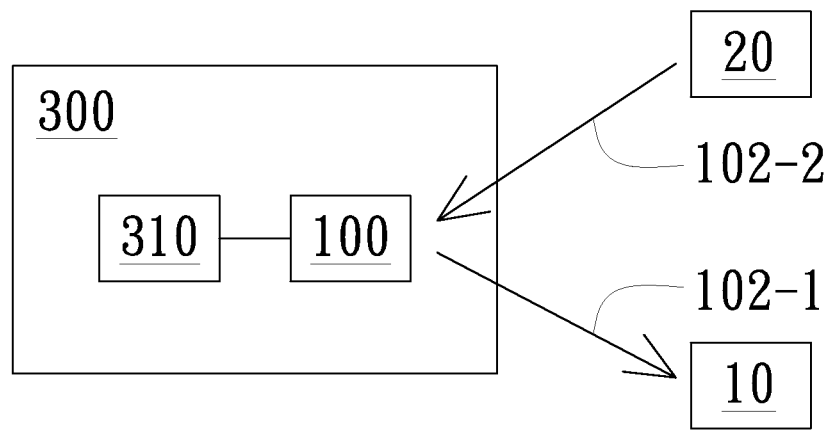
FIG. 3 is a block view of a projector device in accordance with an embodiment of the present invention.

It is to be noted that the Bluetooth device 100 of the present invention can be applied to a variety of electronic devices, such as a projector device. FIG. 3 is a block view of a projector device in accordance with an embodiment of the present invention. The same reference numerals in FIGS. 1 and 3 represent the same component or signal. Referring to FIG. 3, the projector device 300 in the present embodiment includes an optical projection device 310 and the Bluetooth device 100 electrically coupled to the projection device 310. The structure and operation mode of the Bluetooth device 100 have been described in the previous embodiments. As described above, the Bluetooth device 100 is not limited for transmitting audio signals. In other words, the Bluetooth device 100 may be used to transmit other types of signals, such as video signal, picture signal, text signal or image signal composed of pictures and text. Thus, in one embodiment, the optical projection device 310 is configured to project the received image signals in real time. In one embodiment, the peripheral device 10 may be a wireless Bluetooth speaker and the peripheral device 20 may be a handheld device capable of outputting audio signals. Thus, through the Bluetooth device 100, the audio signals outputted from the peripheral device 20 (a handheld device) can be transmitted to the peripheral device 10 (a wireless Bluetooth speaker) for audio playing. In another embodiment, the peripheral device 10 may be a wireless Bluetooth speaker and the peripheral device 20 may be a handheld device capable of outputting signals composed of image signals and audio signals. Thus, the image signals outputted from the peripheral device 20 (a handheld device) can be projected by the projection device 310 in real time and the audio signals outputted from the peripheral device 20 (a handheld device) can be transmitted to the peripheral device 10 (a wireless Bluetooth speaker) for audio playing simultaneously. In another embodiment, the projection device 310 comprises a internal speaker (not shown) adapted to be turned on or turned off, the audio signals outputted from the peripheral device 20 (a handheld device) can be simultaneously outputted from the internal speaker of the projection device 310 when the internal speaker of the projection device 310 is turned on.

Moreover, because Bluetooth has limited bandwidth, the Bluetooth transmission distance can be extended through signal connecting a plurality of the Bluetooth devices 100 disclosed in the present invention.

In summary, through configuring the processing circuit to establish the second communication protocol, the Bluetooth device in the receiving mode of the embodiments of the present invention is capable of simultaneously transmitting the received data from one peripheral device to another peripheral device, thereby realizing the data synchronous transmission and real-time data display.

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. A Bluetooth device used for data transmission between a plurality of peripheral devices including a first peripheral device and a second peripheral device, the Bluetooth device comprising:
    a processing circuit;
    a Bluetooth chip, electrically connected to the processing circuit and configured to be capable of being operated in a transmitting mode and a receiving mode for data transmitting and data receiving, respectively; and
    a display unit electrically connected to the processing circuit,
    wherein when the Bluetooth chip is operated in the transmitting mode through a control of the processing circuit, a first communication link is established between the Bluetooth chip and the first peripheral device through a first communication protocol,
    wherein the processing circuit is configured to establish a second communication protocol and the second communication protocol allows the Bluetooth chip operated in the receiving mode to perform a data synchronous transmission,
    wherein when the Bluetooth chip is operated in the receiving mode through a control of the processing circuit, a second communication link is established between the Bluetooth chip and the second peripheral device through a third communication protocol, wherein the second peripheral device transmits a data to the Bluetooth chip through the second communication link and the Bluetooth chip transmits, based on the second communication protocol, the received data to the first peripheral device through the first communication link simultaneously, wherein when being operated in the transmitting mode through the control of the processing circuit, the Bluetooth chip is configured to search the plurality of peripheral devices and display a searching result as a searching list on the display unit in a listing manner, wherein when the first peripheral device is selected from the searching list, the Bluetooth chip is configured to issue a first link request to the first peripheral device, and the first peripheral device responds a first link confirmation to the Bluetooth chip thereby establishing the first communication link through the first communication protocol, wherein the display unit is configured to display a ready-to-transmit-data information when the first communication link is established.

2. The Bluetooth device according to claim 1, wherein when being operated in the receiving mode, the Bluetooth chip is configured, by the second communication protocol, to simultaneously transmit the received data to the first peripheral device through the first communication link in a first-in-first-out streaming manner.

3. The Bluetooth device according to claim 1, wherein the display unit is further configured to display a communication-protocol-established information when the second communication protocol is established, and then the processing circuit controls the Bluetooth chip to be operated in the receiving mode.

4. The Bluetooth device according to claim 3, wherein when the Bluetooth chip is operated in the receiving mode through the control of the processing circuit, the second peripheral device issues a second link request to the Bluetooth chip, and the Bluetooth chip responds a second link confirmation to the second peripheral device thereby establishing the second communication link through the third communication protocol, wherein the display unit is further configured to display a ready-to-receive-data information when the second communication link is established.

5. The Bluetooth device according to claim 1, wherein the data is an audio signal.

6. The Bluetooth device according to claim 1, wherein the processing circuit communicates with the Bluetooth chip in accordance with Universal Asynchronous Receiver/Transmitter (UART).

7. A data transmission method of a Bluetooth device for transmitting data between a plurality of peripheral devices including a first peripheral device and a second peripheral device, the data transmission method comprising:

searching the plurality of peripheral devices, displaying a search result as a searching list of the plurality of peripheral devices and selecting the first peripheral device from the searching list;

issuing a first link request to the first peripheral device when the first peripheral device is selected from the searching list;

receiving a first link confirmation responding from the first peripheral device thereby establishing a first communication link between the Bluetooth device and the first peripheral device through a first communication protocol;

displaying a ready-to-transmit-data information when the first communication link is established;

establishing a second communication protocol;

receiving a second link request issued from a second peripheral device;

responding a second link confirmation to the second peripheral device thereby establishing a second communication link between the Bluetooth device and the second peripheral device through a third communication protocol; and receiving a data transmitted from the second peripheral device through the second communication link, linking the first and second communication links through the second communication protocol, and simultaneously transmitting the received data to the first peripheral device through the first communication link.

8. A projector device, comprising:

an optical projection device; and a Bluetooth device, electrically coupled to the optical projection device, used for data transmission between a plurality of peripheral devices including a first peripheral device and a second peripheral device, the Bluetooth device comprising a processing circuit, a Bluetooth chip, and a display unit, the Bluetooth chip being electrically connected to the processing circuit and configured to be capable of being operated in a transmitting mode and a receiving mode for data transmitting and data receiving, respectively, the display unit electrically connected to the processing circuit, wherein when the Bluetooth chip is operated in the transmitting mode through a control of the processing circuit, a first communication link is established between the Bluetooth chip and the first peripheral device through a first communication protocol, wherein the processing circuit is configured to establish a second communication protocol and the second communication protocol allows the Bluetooth chip operated in the receiving mode to perform a data synchronous transmission, wherein when the Bluetooth chip is operated in the receiving mode through a control of the processing circuit, a second communication link is established between the Bluetooth chip and the second peripheral device through a third communication protocol, wherein the second peripheral device transmits a data to the Bluetooth chip through the second communication link and the Bluetooth chip transmits, under a permission of the second communication protocol, the received data to the first peripheral device through the first communication link simultaneously, wherein when being operated in the transmitting mode through the control of the processing circuit, the Bluetooth chip is configured to search the plurality of peripheral devices and display a searching result as a searing list on the display unit in a listing manner, wherein when the first peripheral device is selected from the searching list, the Bluetooth chip is configured to issue a first link request to the first peripheral device, and the first peripheral device responds a first link confirmation to the Bluetooth chip thereby establishing the first communication link through the first communication protocol, wherein the display unit is configured to display a ready-to-transmit-data information when the first communication link is established.

9. The projector device according to claim 8, wherein when being operated in the receiving mode, the Bluetooth chip is configured, by the second communication protocol, to simultaneously transmit the received data to the first peripheral device through the first communication link in a first-in-first-out (FIFO) streaming manner.

10. The projector device according to claim 8, wherein the display unit is further configured to display a communication-protocol-established information when the second communication protocol is established, and then the processing circuit controls the Bluetooth chip to be operated in the receiving mode.

11. The projector device according to claim 10, wherein when the Bluetooth chip is operated in the receiving mode through the control of the processing circuit, the second peripheral device issues a second link request to the Bluetooth chip, and the Bluetooth chip responds a second link confirmation to the second peripheral device thereby establishing the second communication link through the third communication protocol, wherein the display unit is further configured to display a ready-to-receive-data information when the second communication link is established.

12. The projector device according to claim 8, wherein the data is an audio signal.

13. The projector device according to claim 8, wherein the processing circuit communicates with the Bluetooth chip in accordance with Universal Asynchronous Receiver/Transmitter (UART).

14. The projector device according to claim 8, wherein the first peripheral device is a wireless Bluetooth speaker.

15. The projector device according to claim 8, wherein the second peripheral device is a handheld device capable of outputting an audio signal.

* * * * *